United States Patent Office 3,534,030
Patented Oct. 13, 1970

3,534,030
PHENOTHIAZINE DERIVATIVES
Milton Wolf, West Chester, Pa., assignor to American Home Products Corporation, New York, N.Y., a corporation of Delaware
No Drawing. Filed Feb. 12, 1968, Ser. No. 704,535
Int. Cl. C07d 93/14
U.S. Cl. 260—243                   4 Claims

ABSTRACT OF THE DISCLOSURE

This invention concerns (2 - phenothiazinyl)ketone, amidinohydrazones which are pharmacologically efficacious as mydriatic agents.

---

The present invention relates to new and novel phenothiazine derivatives. More particularly, it is concerned with (2-phenothiazinyl)ketone, amidinohydrazones which are pharmacodynamically active as mydriatic agents.

The new and novel compounds within the scope of the present invention are exemplified by the following structural formula:

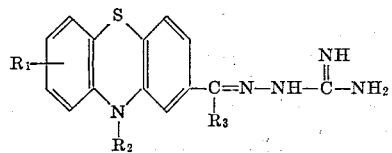

wherein $R_1$ is selected from the group consisting of hydrogen, lower alkyl, lower alkoxy, lower alkylthio, halogen, trifluoromethyl, carbamoyl, sulfamoyl and di(lower)alkylsulfamoyl; $R_2$ is selected from the group consisting of hydrogen, lower alkyl, lower alkanoyl, and di(lower) alkylamino(lower)alkyl, lower alkylpiperazino(lower) alkyl, and hydroxy(lower)alkylpiperazino(lower)alkyl; and $R_3$ is selected from the group consisting of hydrogen, lower alkyl, phenyl and phen(lower)alkyl. As employed herein the "lower alkyl," "lower alkoxy" and "lower alkanoyl" are meant to include both branched and straight chain moieties containing from about one to about eight carbon atoms. Typical examples of these compounds are: 1-(2-phenothiazinyl)-1-propanone, amidinohydrazone; 1-(8-chloro-2-phenothiazinyl)-1-propanone, amidinohydrazone; and 1-(7-sulfamoyl-2-phenothiazinyl)-1-propanone, amidinohydrazone.

The new and novel compounds of the preesnt invention are prepared by the process which is illustrated by the following equation:

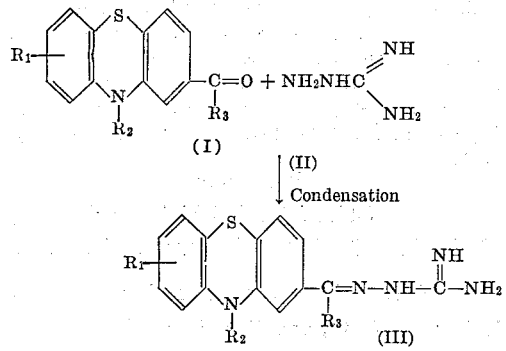

wherein $R_1$, $R_2$ and $R_3$ are defined as above. The condensation reaction is effected by admixing the acidified aqueous solution of aminoguanidine bicarbonate (II) with an appropriate 2-ketophenothiazine (I) in a reaction-inert organic solvent, e.g. an alkanol, dioxane, tetrahydrofuran and dimethoxyethane, and refluxing the reaction mixture for a period of about one to about six hours. Preferably this reaction is conducted by admixing an aqueous solution of aminoguanidine bicarbonate, which has been acidified with a mineral acid, e.g. hydrochloric acid, with a 2-ketophenothiazine in ethanol and refluxing the mixture for about five hours.

When the condensation reaction is complete, the resulting (2-phenothiazinyl)ketone, amidinohydrazone (III) is separated by conventional recovery procedures. For example, the reaction mixture is cooled, filtered, basified, diluted with water, and the resulting solid is collected by filtration and recrystallized from a suitable solvent, e.g. an alkanol-water mixture or a tetrahydrofuran-cyclohexane mixture. The 2-ketophenothiazines (I) employed as starting materials in the above reaction are commercially available or are easily prepared by procedures well known in the art.

The new and novel (2-phenothiazinyl)ketone, amidinohydrazones of the present invention have been found to possess interesting biological properties. More particularly, these compounds in standard pharmacological procedures produce mydriasis and are useful as mydriatic agents.

In the pharmacological evaluation of the mydriatic agents of this invention the in vivo effects of these compounds are tested as follows:

The compound is administered orally to three mice (14 to 24 grams) at each of the following doses: 400, 127, 40, 12.7 and 4.0 mg./kg. The animals are watched for a minimum of two hours during which time signs of general stimulation (i.e., increased spontaneous motor activity, hyperactivity on tactile stimulation, twitching), general depression (i.e., decreased spontaneous motor activity, decreased respiration) and autonomic activity (i.e., miosis, mydriasis, diarrhea) are noted. The animals are tested for changes in reflexes (i.e. flexor, extensor) and are rated by use of a pole climb and inclined screen for the presence of sedation-ataxia. The "Eddy Hot-Plat method" [Nathan B. Eddy and Dorothy Leimbach, J. Pharmacol. Exper. Therap. 107, 385 (1953)] is used to test for analgesia. The experiment is terminated by subjecting each animal to a maximal electroshock to test for anti-convulsant activity.

The compounds of this invention in the above test procedure induce mydriasis at 4.0 mg.kilo. There were no deaths in the test animals at the highest doses used, 400 mg./kg., intraperitoneally.

When the compounds of this invention are employed as mydriatic agents they may be administered to warm-blooded animals, e.g. mice, rats, rabbits, dogs, cats, monkeys, etc. alone or in combination with pharmacologically acceptable carriers, the proportion of which is determined by the solubility and chemical nature of the compound, chosen route of administration and standard biological practice. For example, they may be administered orally in the solid form containing such excipients as starch, milk sugar, certain types of clay and so forth. They may also be administered orally in the form of solutions or they may be injected parenterally. For parenteral administration they may be used in the form of a sterile solution containing other solutes, for example, enough saline or glucose to make the solution isotonic.

The dosage of the present mydriatic agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. In general, the compounds of this invention are mostly desirably administered at a concentration level that will generally afford effective results without causing any harmful or deleterious side effects and preferably at a level that is in the range of from about 1 mg. to about 50 mg. per kilo per day, although as aforementioned variations will occur. However, a dosage level that is in the range of from about 5 mg. to about 15 mg. per kilo per day is most desirably employed in order to achieve results.

The following examples are given by way of illustration and are not to be construed as limitations of this invention, many variations of which are possible without departing from the scope and spirit thereof.

EXAMPLE I

A solution of aminoguanidine bicarbonate (2.72 g., 0.020 m.) in distilled water (25 ml.) containing concentrated hydrochloric acid (3.5 ml.) is added to a suspension of 2-propionylphenothiazine (5.10 g., 0.020 m.) in absolute ethanol (70 ml.). The mixture is refluxed for four hours, cooled and filtered to remove a small amount of insolubles, basified with 50% sodium hydroxide and diluted with water (200 ml.). The product separates as a yellow solid which is collected, washed with water, dried at 50° C./house vac., yield=4.90 g. (78.9%), M.P. 181° dec. (uncorr.). The crude product is recrystallized from tetrahydrofuran-cyclohexane (Darco G–60) affording yellow prisms (2.90 g., 46.7%) of 1-(2-phenothiazinyl)-1-propanone, amidinohydrazone, M.P. 194.5% C. dec.

*Analysis.*—Calcd. for $C_{16}H_{17}N_5S$ (percent): C, 61.71; H, 5.50; N, 22.40. Found (percent): C, 61.66; H, 5.17; N, 22.29, 22.23.

Similarly aminoguanidine bicarbonate is reacted with 2-butyrylphenothiazine to afford 1-(2-phenothiazinyl)-1-butanone, amidinohydrazone.

EXAMPLE II

A solution of aminoguanidine bicarbonate (0.020 m.) in distilled water (25 ml.) containing concentrated hydrochloric acid (3.5 ml.) is added to a suspension of 8-chloro-2-propionylphenothiazine (0.020 m.) in absolute ethanol (70 ml.). The mixture is refluxed for six hours, cooled and filtered to remove a small amount of insolubles, basified with 50% sodium hydroxide and diluted with water (200 ml.). The product separates as a solid which is collected, washed with water, dried and recrystallized from ethanol-water to afford 1-(8-chloro-2-phenothiazinyl)-1-propanone, amidinohydrazone.

In the same manner, 1-(7-bromo-10-methyl-2-phenothiazinyl)-1-acetone, amidinohydrazone; and 1-(8,10-diethyl-2-phenothiazinyl)-1-pentanone, amidinohydrazone are produced.

EXAMPLE III

Repeating the procedure of Examples I and II to react aminoguanidine bicarbonate with an appropriate 2-ketophenothiazine, the following compounds are obtained:

1-(7-methyl-2-phenothiazinyl)phenyl ketone, amidinohydrazone;

1 - [10 - (dimethylaminopropyl)-2-phenothiazinyl]-1-propanone, amidinohydrazone;

1-(7-methoxy - 10 - propionyl-2-phenothiazinyl)-1-propanone, amidinohydrazone;

benzyl(2-phenothiazinyl)ketone, amidinohydrazone;

(10-acetyl-2-phenothiazinyl)(2 - phenethyl)ketone, amidinohydrazone;

(8-ethoxy-2-phenothiazinyl)phenyl ketone, amidinohydrazone;

1-(7-methylmercapto-2-phenothiazinyl) - 1 - butanone, amidinohydrazone;

1-(7-trifluoromethyl - 2 - phenothiazinyl)-1-propanone, amidinohydrazone; and

1-[10-(4-methylpiperazinomethyl) - 2 - phenothiazinyl] phenyl ketone, amidinohydrazone.

EXAMPLE IV

A solution of aminoguanidine bicarbonate (0.40 m.) in distilled water (25 ml.) containing concentrated sulfuric acid (7.0 ml.) is added to a suspension of 7-sulfamoyl-2-propionylphenothiazine (0.040 m.) in dioxane (140 ml.). The mixture is refluxed for two hours, cooled and filtered to remove a small amount of insolubles, basified with 50% potassium hydroxide and diluted with water (400 ml.). The product separates as a solid which is collected, washed with water, dried and recrystallized from tetrahydrofuran-cyclohexane to yield 1-(7-sulfamoyl-2-phenothiazinyl)-1-propanone, amidinohydrazone.

Similarly, 1-(8-dimethylsulfamoyl-2-phenothiazinyl)-1-butanone, amidinohydrazone and 1-(8-methylsulfamoyl-2-phenothiazinyl)-1-pentanone, amidinohydrazone are synthesized.

EXAMPLE V

When the procedure of Example IV is repeated to react aminoguanidine bicarbonate with 10(2-dimethylaminoethyl)-2-propionylphenothiazine there is obtained 1-[10 - (2-dimethylaminoethyl-2-phenothiazinyl] - 1 - propanone, amidinohydrazone.

In like manner, the following compounds are produced:

1-(10-butyl-7-fluoro-2-phenothiazinyl)-1-propanone, amidinohydrazone;

1-[10-(2-hydroxyethylpiperazinoethyl)-2-phenothiazinyl] phenyl ketone, amidinohydrazone;

1-(8-carbamoyl-2-phenothiazinyl)-1-butanone, amidinohydrazone; and 1-(7-ethylmercapto-2-phenothiazinyl)-1-propanone, amidinohydrazone.

What is claimed is:

1. A compound selected from the group consisting of those having the formula:

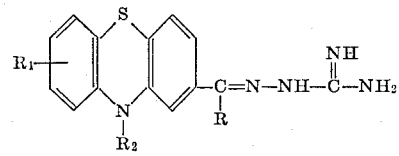

wherein $R_1$ is selected from the group consisting of hydrogen, and 8-chloro; $R_2$ is selected from the group consisting of hydrogen, lower alkyl, lower alkanoyl, and di(lower)alkylamino (lower)alkyl, lower alkylpiperazino (lower)alkyl, and hydroxy (lower)alkylpiperazino(lower)alkyl; and $R_3$ is selected from the group consisting of lower alkyl, and phenyl.

2. A compound as described in claim 1 which is: 1-(2-phenothiazinyl)-1-propanone, amidinohydrazone.

3. A compound as described in claim 1 which is: 1-(2-phenothiazinyl)-1-butanone, amidinohydrazone.

4. A compound as described in claim 1 which is: 1-(8-chloro-2-phenothiazinyl)-1 - propanone, amidinohydrazone.

References Cited

UNITED STATES PATENTS 3,113,131   3/1963   Tchelitcheff et al. ____ 260—243

HENRY R. JILES, Primary Examiner

H. I. MOATZ, Assistant Examiner

U.S. Cl. X.R.

424—247

UNITED STATES PATENT OFFICE
CERTIFICATE OF CORRECTION

Patent No. 3,534,030     Dated MAR 25 1971

Inventor(s) Milton Wolf

It is certified that error appears in the above-identified patent and that said Letters Patent are hereby corrected as shown below:

At column 4, formula under Claim 1, R should read $R^3$ as shown below:

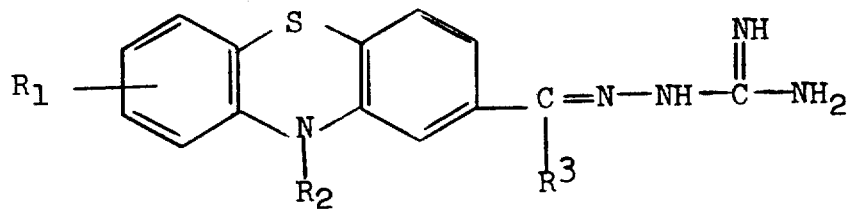

Signed and sealed this 25th day of May 1971.

(SEAL)
Attest:

EDWARD M. FLETCHER, JR.
Attesting Officer

WILLIAM E. SCHUYLER, JR.
Commissioner of Patents